United States Patent
Plouzen

(10) Patent No.: US 11,647,734 B2
(45) Date of Patent: May 16, 2023

(54) VARIABLE DIMENSION POULTRY FEEDER

(71) Applicant: Philippe Plouzen, Sibiril (FR)

(72) Inventor: Philippe Plouzen, Sibiril (FR)

(73) Assignee: BUTTERFLY CONCEPTS LLC, Middlebury, IN (US)

( * ) Notice: Subject to any disclaimer, the term of this patent is extended or adjusted under 35 U.S.C. 154(b) by 115 days.

(21) Appl. No.: 17/385,163

(22) Filed: Jul. 26, 2021

(65) Prior Publication Data
US 2021/0345585 A1 Nov. 11, 2021

Related U.S. Application Data

(63) Continuation-in-part of application No. 16/124,683, filed on Sep. 7, 2018, now Pat. No. 11,076,580.

(51) Int. Cl.
*A01K 39/012* (2006.01)
*A01K 39/014* (2006.01)

(52) U.S. Cl.
CPC ........ *A01K 39/0125* (2013.01); *A01K 39/012* (2013.01); *A01K 39/014* (2013.01)

(58) Field of Classification Search
CPC .... A01K 39/0125; A01K 39/014; A01K 5/01; A01K 1/0356; A01K 39/012; A01K 39/01; A01K 5/02
See application file for complete search history.

(56) References Cited

U.S. PATENT DOCUMENTS

| | | | |
|---|---|---|---|
| 700,522 | A | 5/1902 | Maginnis |
| 1,200,275 | A | 10/1916 | Tremper |
| 1,629,979 | A | 5/1927 | Steinback |
| 1,771,647 | A | 7/1930 | Moe |
| 1,832,999 | A | 11/1931 | Rummell |
| 1,868,957 | A | 7/1932 | Tolley |
| 2,163,186 | A | 6/1939 | Bergeron |
| 2,361,598 | A | 10/1944 | Calhoon |
| 2,514,491 | A | 7/1950 | Hay et al. |
| 2,735,402 | A * | 2/1956 | De ........................ A01K 39/014 119/61.31 |
| 4,375,791 | A | 3/1983 | Peppler |
| 4,947,798 | A | 8/1990 | De Wispelaere |
| 5,462,017 | A | 10/1995 | Pollock et al. |
| 5,778,821 | A | 7/1998 | Horwood et al. |
| 6,467,429 | B1 * | 10/2002 | Plouzen ............. A01K 39/0125 119/61.31 |
| 9,723,811 | B2 | 8/2017 | Dalrymple |

* cited by examiner

*Primary Examiner* — Christopher D Hutchens
*Assistant Examiner* — Steven J Shur
(74) *Attorney, Agent, or Firm* — Flynn Thiel, P.C.

(57) ABSTRACT

A feed hopper with two chute members is provided. The chutes are movable with respect to one another and one chute has an extending lip to engage the inner surface of the other chute to prevent feed from escaping the hopper.

14 Claims, 13 Drawing Sheets

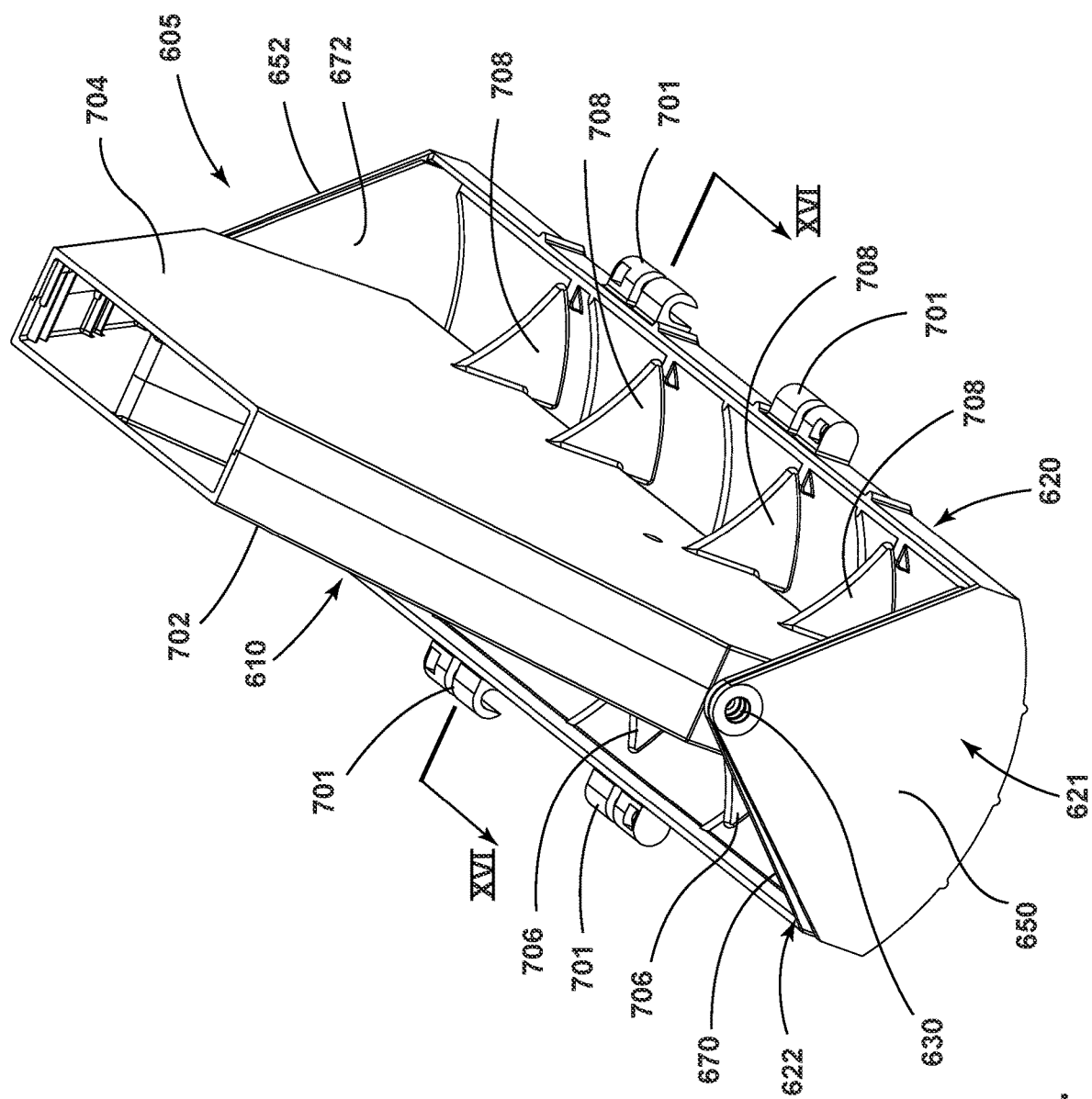

VARIABLE DIMENSION POULTRY FEEDER

CROSS REFERENCE TO RELATED APPLICATIONS

This is a continuation-in-part of prior U.S. application Ser. No. 16/124,683, filed Sep. 7, 2018.

BACKGROUND AND SUMMARY OF THE INVENTION

The present invention concerns a feeder for poultry, used mainly in a poultry feeding facility. In particular, the present invention relates to apparatus for feeding poultry or like animals in large scale houses over the entire life cycle of the animals.

Such a facility typically includes a feed-distribution system connected to screw conveyors mounted in very long tubes. Regularly spaced along each conveyor are several feeders, pans or receptacles connected to the conveyors so as to receive feed therefrom. The feed transported by each tube is routed to the feeders as they are being emptied, so as to refill them.

One embodiment of the present invention is a feeder which is adapted for use by animals of young age as well as adult animals. An advantage of embodiments of the invention is a variable feed capacity of a feeder, which can be varied according to the age of the animals to which it is applied, and which has a structure to prevent feed from escaping.

Another advantage of embodiments of the present invention is a feeder which can accommodate fine-grain feed without unwanted spillage/seepage and waste.

Another embodiment of a feeder according to the present invention includes a first tray member having a base and a second tray member having a base and a lip extending therefrom. The feeder also has a top member disposed above and engaging the second tray member. The first tray member and the second tray member are adjacent and moveable with respect to each other, together defining a size-adjustable tray. An end edge of the lip engages the base of the first tray member and the top member prevents the first tray member from moving away from the first tray member.

According to a preferred characteristic of the present invention, the two chutes, to be able to assume their relative positions, are able to pivot freely one about the other and independently of each other. Appropriately, each chute is shaped as a portion of a cylinder.

According to another preferred characteristic of the present invention, the feeder includes a feed hopper with an opening at its top through which the feed from a distribution system is emptied and with an opening in its lower part, that empties into the receptacle.

According to another preferred characteristic of the present invention, inside the hopper there is a feed flow directing wall in the general shape of an inverted V.

According to another preferred characteristic of the present invention, the feeder includes a manual control system for pivoting or moving the chutes between a variety of desired positions of different feed retaining capacity or no feed retaining capacity.

According to one variation, the feeder includes a control system, for pivoting the chutes, that is equipped with a cable, a connection system attached to the cable on one end, and, on the other end, attached to the outer edges of each of the chutes, by means of shafts, rods or additional cables.

According to another preferred characteristic of the present invention, the connection system consists of a first lever that can pivot about a pin and two secondary levers connected to the pin, the free ends of the secondary levers being connected to the edges of the chutes.

According to another preferred characteristic of the present invention, the inner edge of the inner chute includes a lip closely adjacent or in contact with the outer chute. Preferably, the inner edge of the outer chute has one or more leads to assist in preventing the lip from catching the inner edge of the outer chute.

According to another preferred characteristic of the present invention, it is possible to pivot the two chutes to their maximum position, in such a way that they no longer overlap, thus opening the lower part of the receptacle.

The characteristics of the invention mentioned above, as well as others, will appear more clearly in reading the following description of preferred embodiments of the present invention, said description relating to the attached drawings.

BRIEF DESCRIPTION OF THE DRAWINGS

FIG. 14 is a perspective view of an additional embodiment of a feeder, which includes feed saving members and a nub.

DESCRIPTION OF PREFERRED EMBODIMENTS

Figure 1:
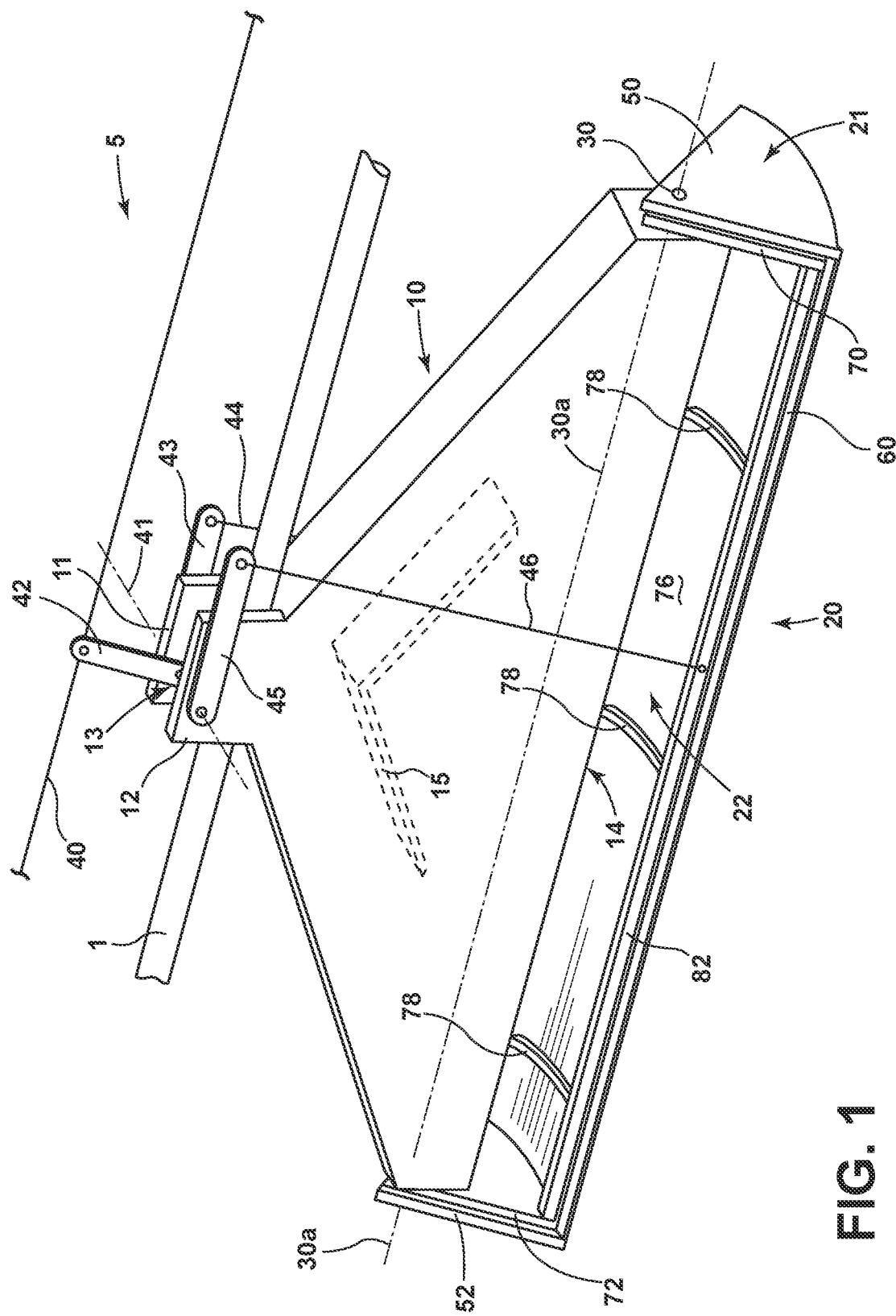
FIG. 1 is a perspective view of a feeder according to the present invention, the feeder being in a position of low capacity.

The feeder 5 in FIG. 1, in a simplified form, includes a feeder pan of feed hopper 10 in the general shape of an inverted V. This hopper 10 serves as a reservoir for feed. The top of the hopper 10 is, for example, formed from two plates 11 and 12 that serve to fix with respect to it to a feed distribution system, consisting, for example, of a substantially horizontal tube 1 in which there is a conventional feed screw conveyor. In a large scale poultry feeding system, a plurality of such hoppers 10 are disposed along a length of tube 1. The hopper 10 is made with an opening 13 through which the feed from the distribution system conveyor is allowed to flow into hopper 10 in a conventional manner. The lower part of the hopper 10 is made with an opening 14 which extends, for example, its entire length and entire width. The hopper 10 is configured and arranged to empty the feed from the distribution system conveyor into a receptacle 20 formed at the lower portion of the hopper 10.

Figure 2:
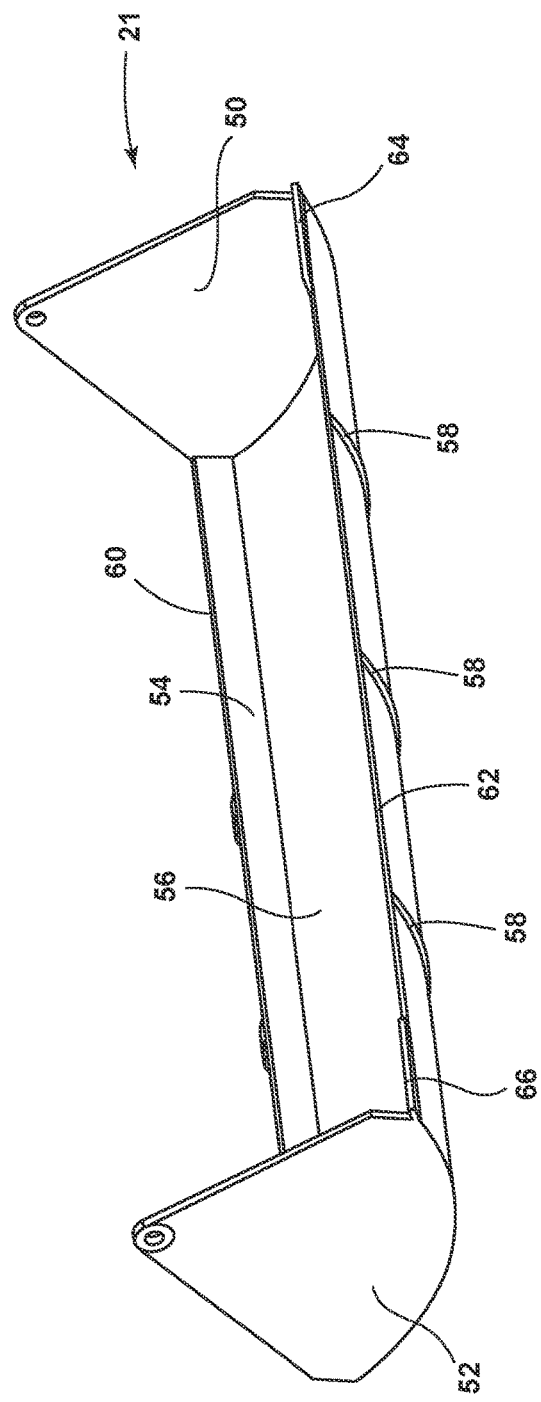
FIG. 2 is a front perspective view of an outer tray chute of the feeder of FIG. 1, the outer tray chute including leads.
Figure 3:
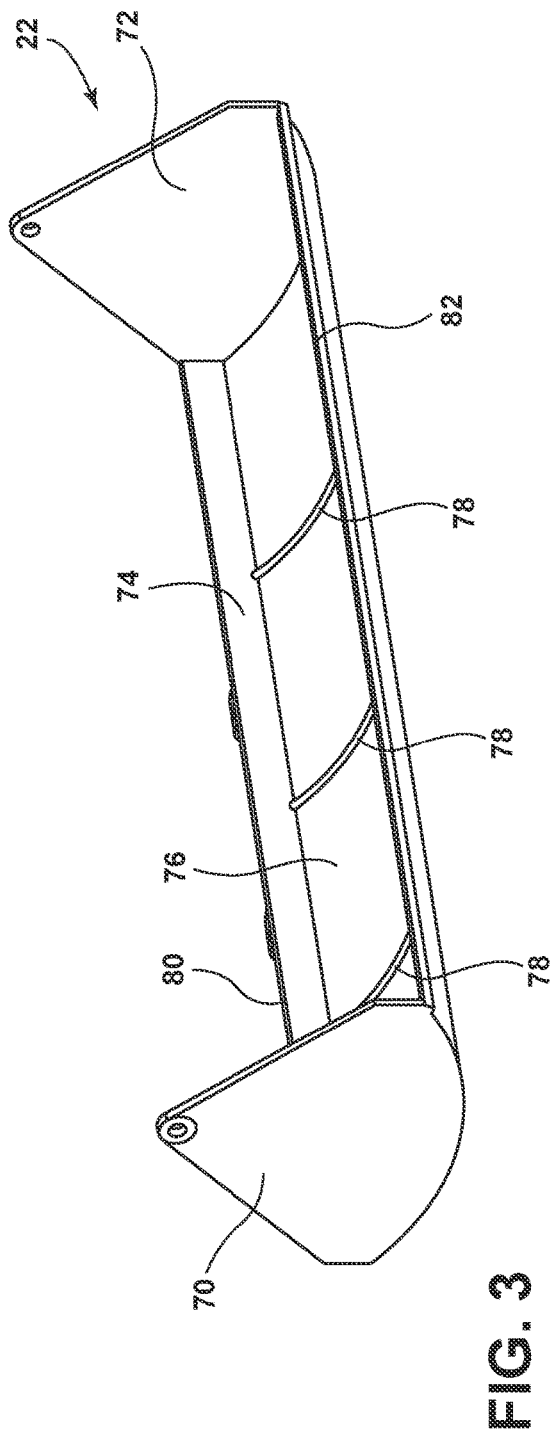
FIG. 3 is a rear perspective view of an inner tray chute of the feeder of FIG. 1, the inner tray chute including a lip.

In the preferred embodiment illustrated, the receptacle 20 has two relatively movable walls or chutes 21 and 22. The chute 21 can, for example, be formed from two lateral walls 50 and 52 (see FIG. 2), each of those walls presenting an arc of circular section, and a back wall 54 supported by and joining the lateral walls 50 and 52. The chute 21 also includes a base 56 extending between the walls 50 and 52, which is preferably curved, so that the chute 21 presents the shape of a portion of a cylinder or the shape of a curved cradle or the shape of a trough.

The base 56 preferably has a plurality of reinforcement ribs 58 on its underside. On one side of the chute 21, the back wall 54 terminates in an upper edge 60. On the opposing side of the chute 21, the base 56, along a majority of the length of the chute 21, terminates in an inner edge 62. Adjacent one end of the chute 21, extending from the inner edge 62, is a first lead 64. Adjacent the opposite end of the chute 21 extending from the inner edge 62, is a second lead 66. The leads 64, 66 extend at an angle slightly downwardly with respect to the edge 62. Also, the leads 64, 66 are preferably thinner than the base (see FIG. 5).

Similarly, the chute 22 preferably has two lateral walls 70 and 72 and a back wall 74 connected to and bearing on the lower edges of the lateral walls 70 and 72, and a base 76 so that the chute also presents the shape of a portion of a cylinder or the shape of a curved cradle.

The base 76 preferably has a plurality of reinforcement ribs 78 on its upper side. On one side of the chute 22, the back wall 74 terminates in an upper edge 80. On the opposing side of the chute 22, the base 76 has a lip 82 extending outwardly therefrom. The lip 82 preferably extends lengthwise the entire length of the base 76, and extends downwardly with respect to the base 76, as shown in FIGS. 4-7.

In the illustrated example, the chute 22 is of such dimensions that it can be placed closely inside the chute 21 (see FIG. 1), the underside of the base 76 of the chute 22 adjacent to the upper side of the base 56 of the chute 21, preferably so as to seal against the flow of feed therebetween due to the lip 82 engaging the base 56, as shown in FIGS. 4-7.

Figure 5:
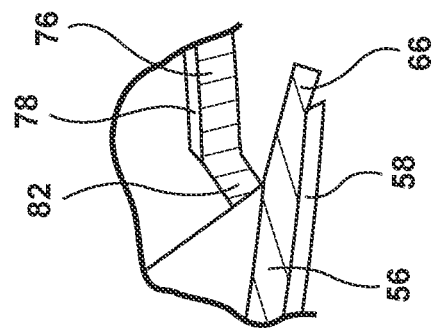
FIG. 5 is an expanded view of portion V of FIG. 4.
Figure 4:
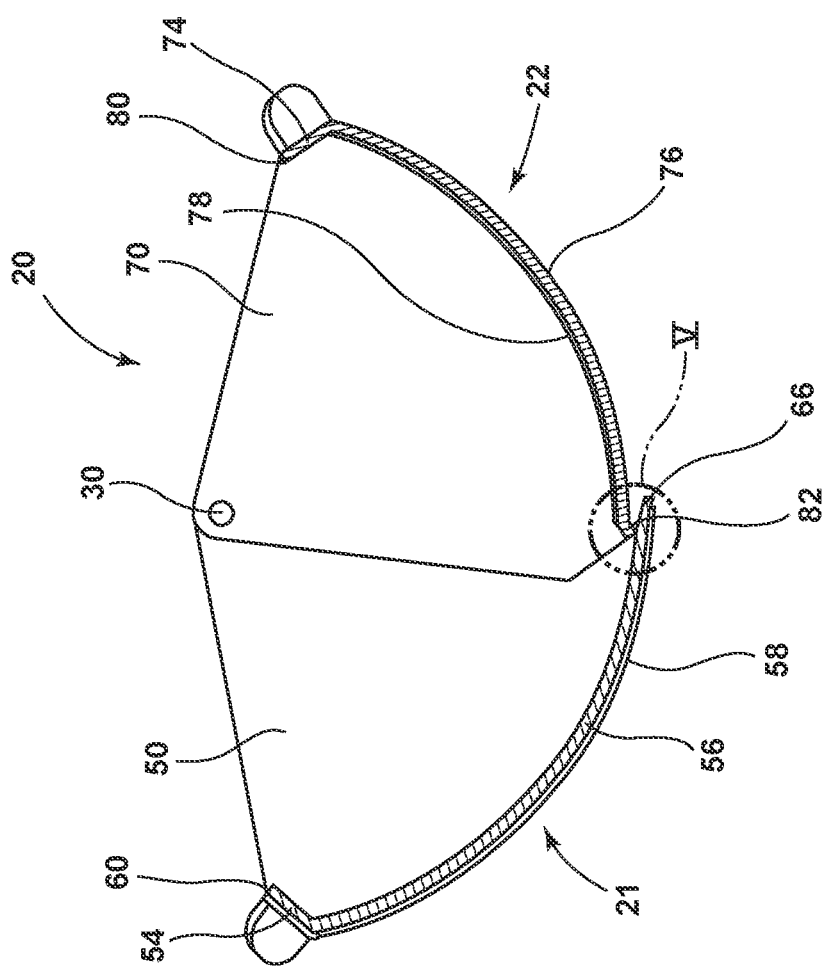
FIG. 4 is a cross-sectional end view of the tray chutes of FIGS. 2 and 3 when connected, the respective position of the chutes being such that the feed capacity is high.

As shown in FIGS. 4-5, the lip 82 may engage one or both of the leads 64, 66 as the chutes 21, 22 are rotated toward one another. The leads 64, 66 ensure that the lip 82 does not get caught on the inner edge of the chute 21, and cause the lip 82 to slide easily onto the upper side of the base 56. The engagement of the lip 82 and the upper side of the base 56 prevents even the finest feed from escaping the feed hopper 10.

Figure 7:
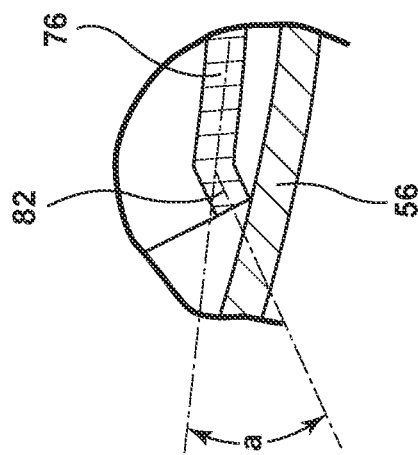
FIG. 7 is an expanded view of portion VII of FIG. 6.
Figure 6:
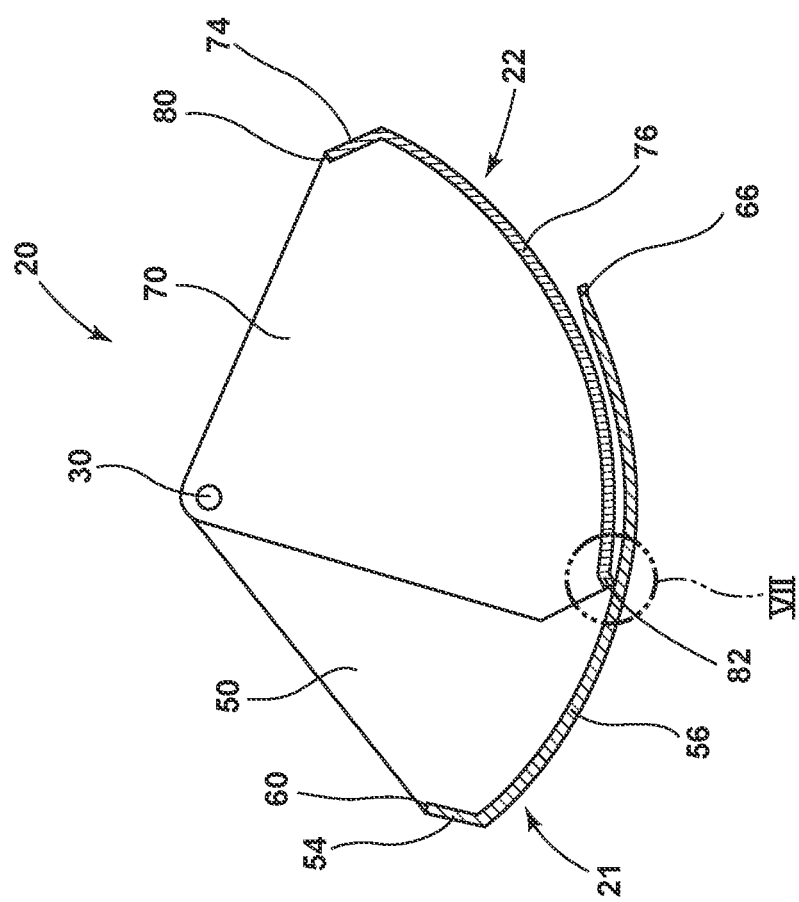
FIG. 6 is a cross-sectional end view of the tray chutes of FIGS. 2 and 3 when connected, the respective position of the chutes being that the feed capacity is lower than that of FIG. 4.

As the chutes 21, 22 are rotated toward or away from each other, the lip 82 preferably stays in engagement with the upper side of the base 56. The chutes 21, 22 are shown in FIGS. 6-7 in another respective position. As seen in these drawings, the lip 82 is in contact with the base 56 in this position as well, and preferably remains in contact throughout the entirety of movement of the chutes 21, 22 relative to each other. The lip 82 preferably extends downwardly with respect to the base 76 at an angle "a." Angle a is preferably between about 25° and about 35°, and most preferably is about 30°.

On their upper parts, lateral walls 50 and 52 of the chute 21 as well as lateral walls 70 and 72 of the chute 22 include a hole made to receive horizontal pins 30 connected to the hopper 10. In the illustrated example, each pin 30 is aligned along a longitudinal axis 30a and the chutes 21 and 22 are mounted so as to pivot freely and independently of each other about these pins 30 on axis 30a so as to assume a position as shown in FIG. 1, for example, with the chute 22 disposed inside the chute 21. Stated another way, the chutes 21 and 22 are pivotably connected so as to form a butterfly joint between them. When the chutes 21, 22 are moved with respect to one another, the lip 82 scrapes the upper side of the base 56.

In preferred embodiments, the distance between the opening 14 and the chute 22 is established to be smaller than an area within which the poultry or animals being fed can enter. Thus, when the chutes 21 and 22 fully overlap, the poultry can get their head in to peck at the feed on the chutes, but not actually stand on the chutes to enter receptacle 20 and thereby contaminate the feed.

One will note that in the position of FIG. 1, the feed retaining capacity of receptacle 20 is at its lowest while in the position of FIGS. 4-5, it is at its highest. FIGS. 6-7 show an intermediate position.

The reference numeral 120 (FIG. 8) generally designates another embodiment of the present invention, being a second embodiment for the variable dimension poultry feeder. Since the receptacle 120 is similar to the previously described receptacle 20, similar parts appearing in FIGS. 1-7 and FIG. 8, respectively, are represented by the same, corresponding reference number except for adding 100 to the part numbers of the former for the embodiment depicted in FIG. 8.

Figure 8:
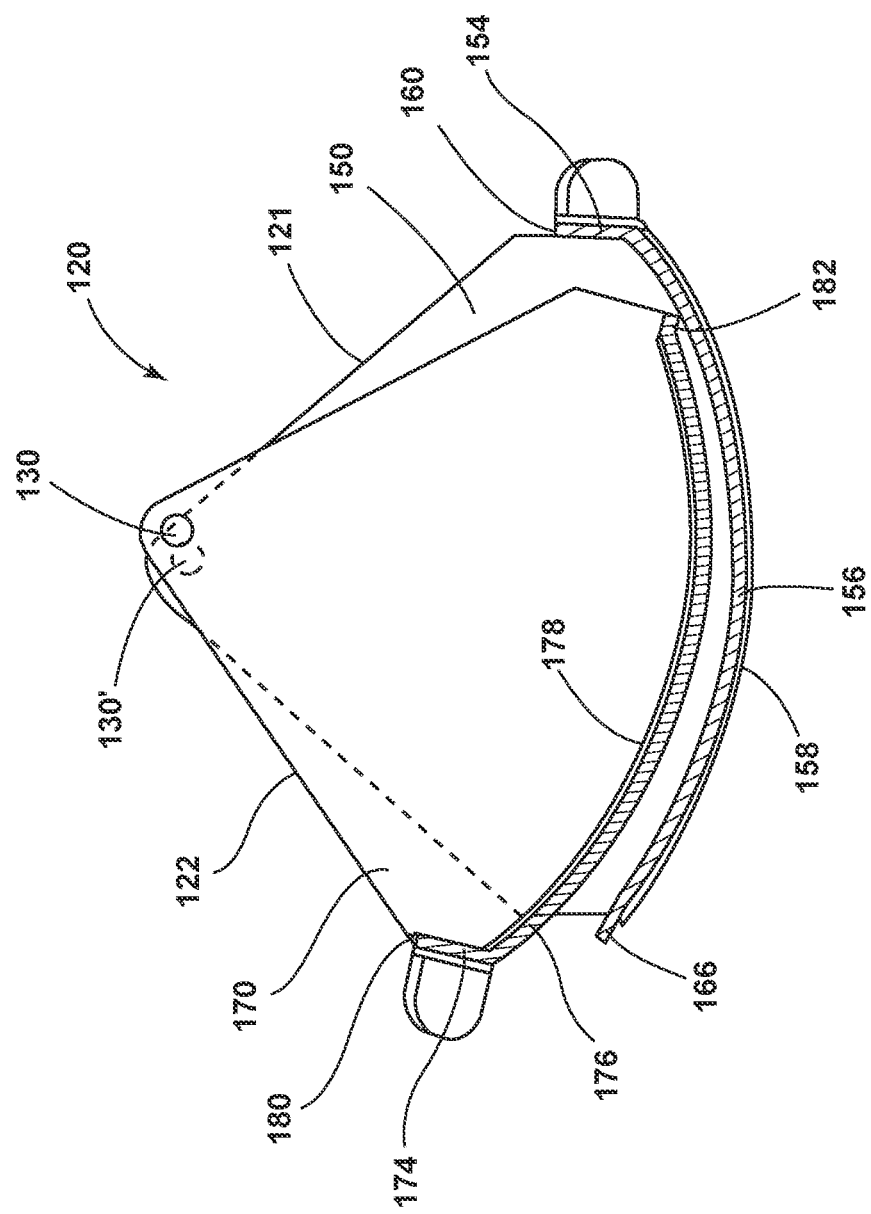
FIG. 8 is a cross-sectional end view of the tray chutes of a second embodiment, when the tray chutes are connected.

The receptacle 120, shown in FIG. 8, is similar to the first embodiment of FIGS. 1-7 in that there is an outer chute 121 and an inner chute 122. The outer chute 121 includes a base 156 with a plurality of reinforcement ribs 158 on its underside. The chute 121 also has a first lateral wall 150 and a second lateral wall (not shown) with each of the walls presenting an arc of circular section, and a back wall 154 supported by and joining the lateral walls. The back wall 154 terminates in an upper edge 160. Extending from the base 156, and adjacent one end of the chute 121, is a lead 166. Additional leads may be employed such as at the opposite end of the chute 121, as discussed above.

The inner chute 122 includes a first lateral wall 170 and a second lateral wall (not shown), in addition to a back wall 174 that extends between the lateral walls and terminates in an upper edge 180. A base 176 extends between the lateral walls and preferably has a plurality of reinforcement ribs 178 on its upper side. The base 176 includes a lip 182 extending outwardly therefrom. The lip 182 preferably extends the entire length of the base 176 and extends downwardly with respect to the base 176.

The chute 122 is connected to a rod or other member creating a pivot point at the reference numeral 130 as depicted in FIG. 8. The chute 121 is connected to a rod or other member at a pivot point that is depicted by reference numeral 130' in FIG. 8. In this embodiment, the pivot points 130 and 130' are in different locations; that is, chutes 121 and 122 pivot around different axes. If positioned correctly, this creates a structure whereby the lip 182 makes more contact and scrapes more fully against the upper surface of the base 156 as the chute 122 rotates inwardly (that is, as the lip 182 travels toward the back wall 154).

Figure 9:
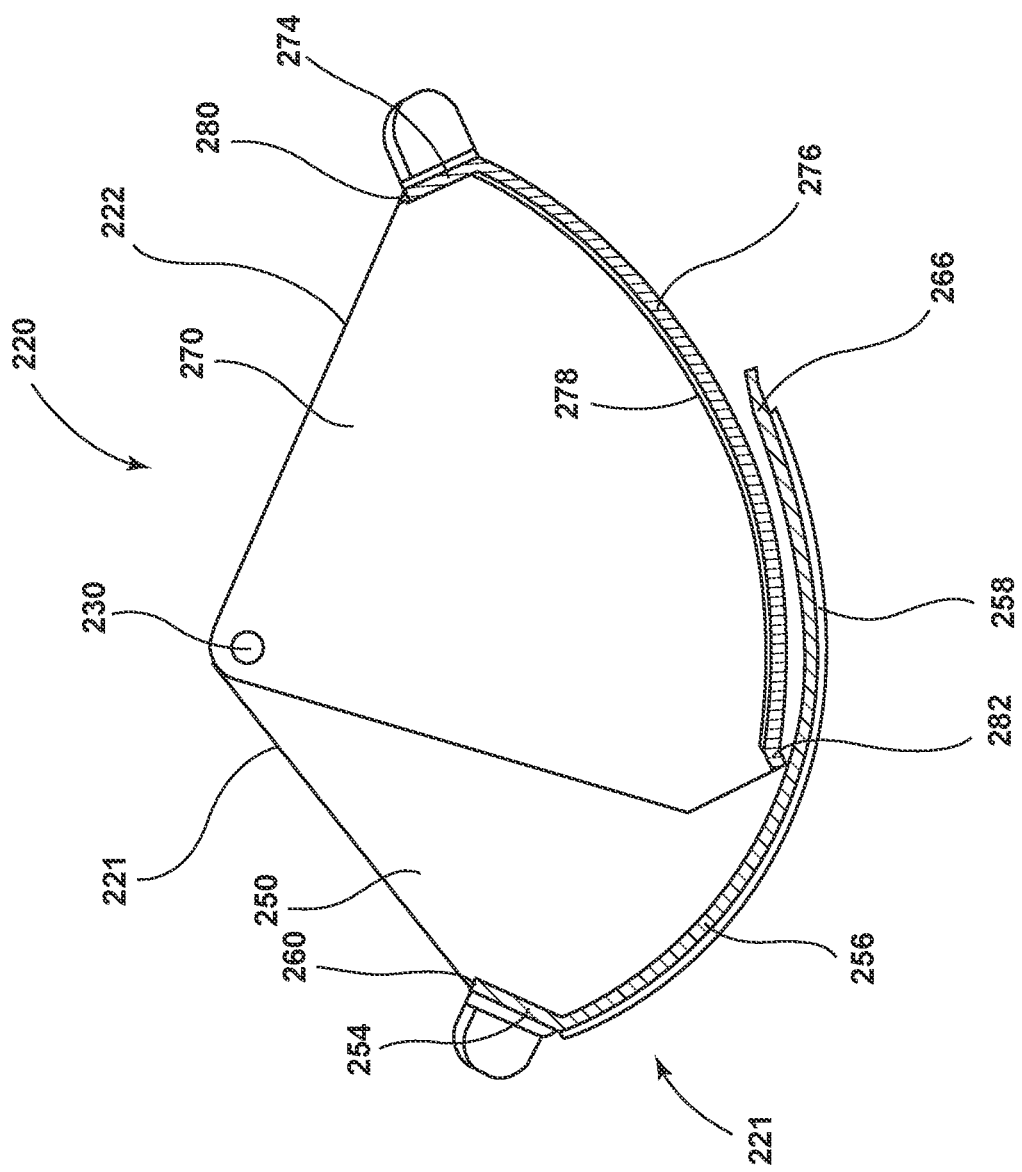
FIG. 9 is a cross-sectional end view of the tray chutes of a third embodiment, when the tray chutes are connected.

The reference numeral 220 (FIG. 9) generally designates yet another embodiment of the present invention, being a third embodiment of the variable dimension poultry feeder. Since the receptacle 220 is similar to the previously described receptacle 20, similar parts appearing in FIGS. 1-7 and FIG. 9, respectively, are represented by the same, corresponding number except that 200 is added to the numerals of the latter.

In this embodiment, the receptacle 220 has two chutes 221 and 222. The chute 221 is the outer chute and includes a first lateral wall 250 and a second lateral wall (not shown), each of the walls representing an arc of circular section. The chute 221 also has a back wall 254 supported by and joining the lateral walls. The chute 221 includes a base 256 extending between the lateral walls, and which is preferably curved. The base 256 preferably has a plurality of reinforcement ribs 258 on its underside. The back wall 254 preferably terminates in an upper edge 260. The base 256 terminates at its inner edge in one or more leads 266. The leads are preferably placed adjacent opposite ends of the chute 221 (that is, each near a lateral wall) but may be placed anywhere that is useful or may extend the entire length of the base 256.

The inner chute 222 includes a base 276 that terminates in a lip 282 that preferably extends the entire length of the base 276. Preferably, a plurality of reinforcement ribs 278 are attached to the upper side of the base 276. A back wall 274 is attached and supported by the base 276 and terminates in an upper edge 280. Both of the chutes 221 and 222 are connected at and rotate about a rod or other member at a pivot axis 230.

In this embodiment, the curvature of the base 256 is slightly tighter than that of the base 276. In other words, the radius associated with the arc created by the base 256 is slightly smaller than the radius associated with the arc created by the base 276. Due to this difference in curvatures, the lip 282 in this embodiment will continually engage in a tighter fashion and thus ensure more of a seal between the lip 282 and the upper surface of the base 256 as the chute 222 rotates inwardly with respect to the chute 221 (i.e., as the lip 282 moves toward the back wall 254).

Controlling the relative position or opening and closing of the chutes 21 and 22 (or 121, 122 or 221, 222) can be done manually, for example, by a hand wheel mounted at the level of pin 30. In FIG. 1 a remote control system is shown. In a simplified version, this control system consists of a cable 40 that runs parallel to the tube 1 of the distribution system and can connect to each of the hoppers 10 used along the tube 1 so as to provide simultaneous control. A lever 42 is mounted between the two plates 11 and 12 of the hopper 10. The lever 42 pivots about a laterally extending rod or pin 41 perpendicular to the plates 11 and 12. The free end of the lever 42 is attached to the cable 40. A lever 43 is mounted integral with the pin 41, outside the plate 11 in the illustrated example. The free end of the lever 43 is connected to the outside edge of the chute 21 by means of a cable, rod or shaft 44. Similarly, another lever 45 is mounted integral with the pin 41, outside the plate 12. The free end of the lever 45 is connected to the outside edge of the chute 22 by means of a cable, rod or shaft 46.

One will note that the levers 42, 43, and 44 constitute a connection system for the movement of the cable 40 over the edges of each chute 21 and 22, by means of the shafts 44 and 46.

In those embodiments where the cable 40 is commonly used by a plurality of feeders, pulling on the cable to the left or to the right will result in all feeders being adjusted simultaneously and remotely from the feeder location.

Inside the hopper 10 is a bridge wall 15, in the general shape of an inverted V which serves to separate the flow of feed coming from the entrance 13 and to retain a portion of the feed within the hopper 10 as a reservoir. Thus, the feed in the reservoir can be kept more fresh and uncontaminated than the feed exposed in the receptacle 20 until such time and the volume of feed in the receptacle 20 is lowered by consumption. The feed in the hopper 10 then automatically falls into the receptacle 20.

Preferably, each of the chutes 21, 22 presents the shape of a portion of a cylinder with flat end-walls. However, a person skilled in the field will understand that the end-walls could just as easily be hemispheric and likewise that each chute 21 and 22 could present the shape of a hemisphere, inasmuch as the first chute 21 could be inside the second chute 22 in one position, and that, in another position, could only overlap in a small-sized area.

One will also note that in rotating the two chutes to the maximum extent, back walls 54 and 74 will not overlap, but opening the lower part of the receptacle 20 and retaining no feed therein. In fact, it is envisioned that the chutes can be rotated so far as to abut the plates 11 and 12, thereby permitting full exposure to the opening 14 and the interior of the hopper 10 from below hopper 10. Such opening of the receptacle 20 can provide important advantages, especially for emptying and cleaning of the receptacle 20 and/or the hopper 10 between flocks of poultry being raised.

Figure 10:
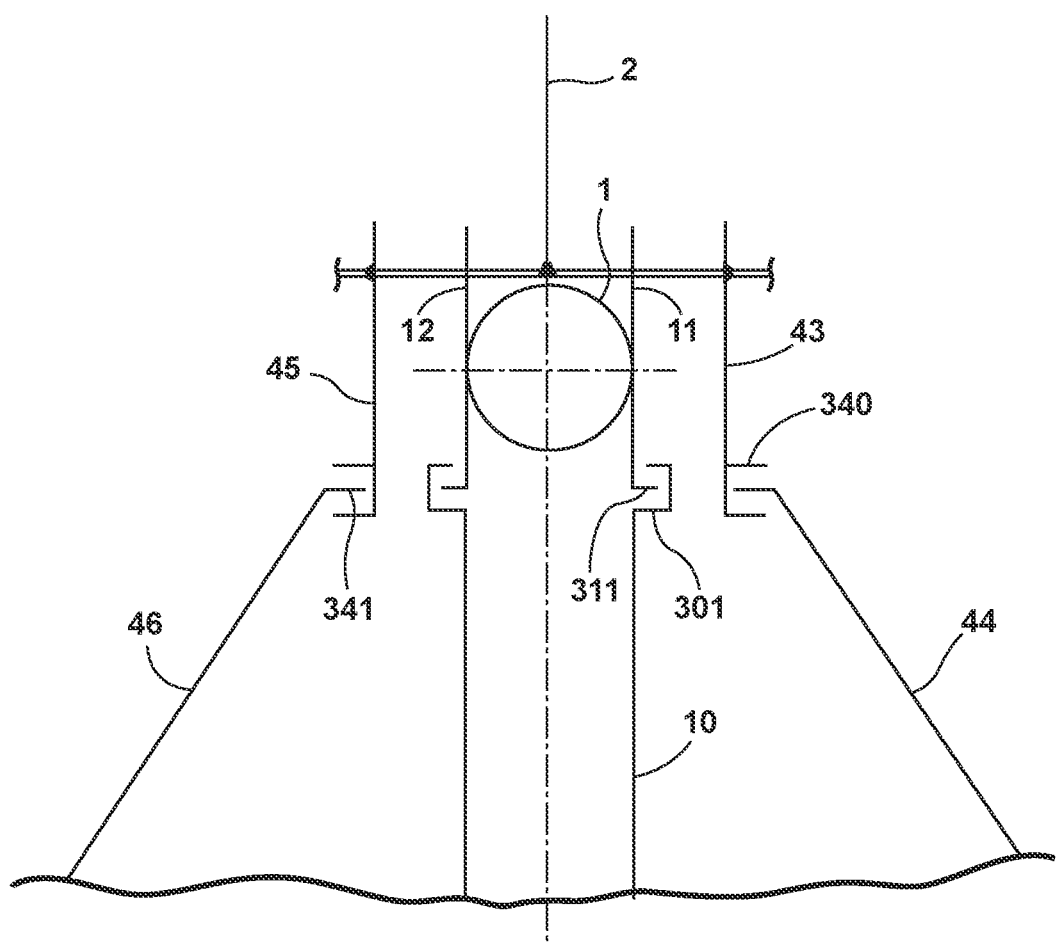
FIG. 10 is a partial, schematic view of a cross section of the feeder, taken laterally with respect to FIG.

FIG. 10 shows the assembly of a feeder according to one preferred variation of the invention, on the tube 1 of a distribution system. According to this variation, the hopper 10 is mounted on the tube 1 so that the feeder assembly can rotate about a vertical axis 2. To do this, the top of the hopper 10 includes an annular groove 301 in which a disc 311 is located where the two plates 11 and 12 bracketing the tube 1 are attached. On the other hand, arms 43 and 45 have their lower ends made with an annular groove 340, and shafts 44 and 46 have their upper ends attached to a ring 341 located in the annular groove 140. This variation permits the feeder to be oriented, for example, so that the receptacle 20 is turned 90 degrees with respect to the view of FIG. 1, axis 30a being then orthogonal to the longitudinal axis of the tube 1, as where a greater number of feeders are desired to be employed along the tube 1, more closely spaced.

Figure 11:
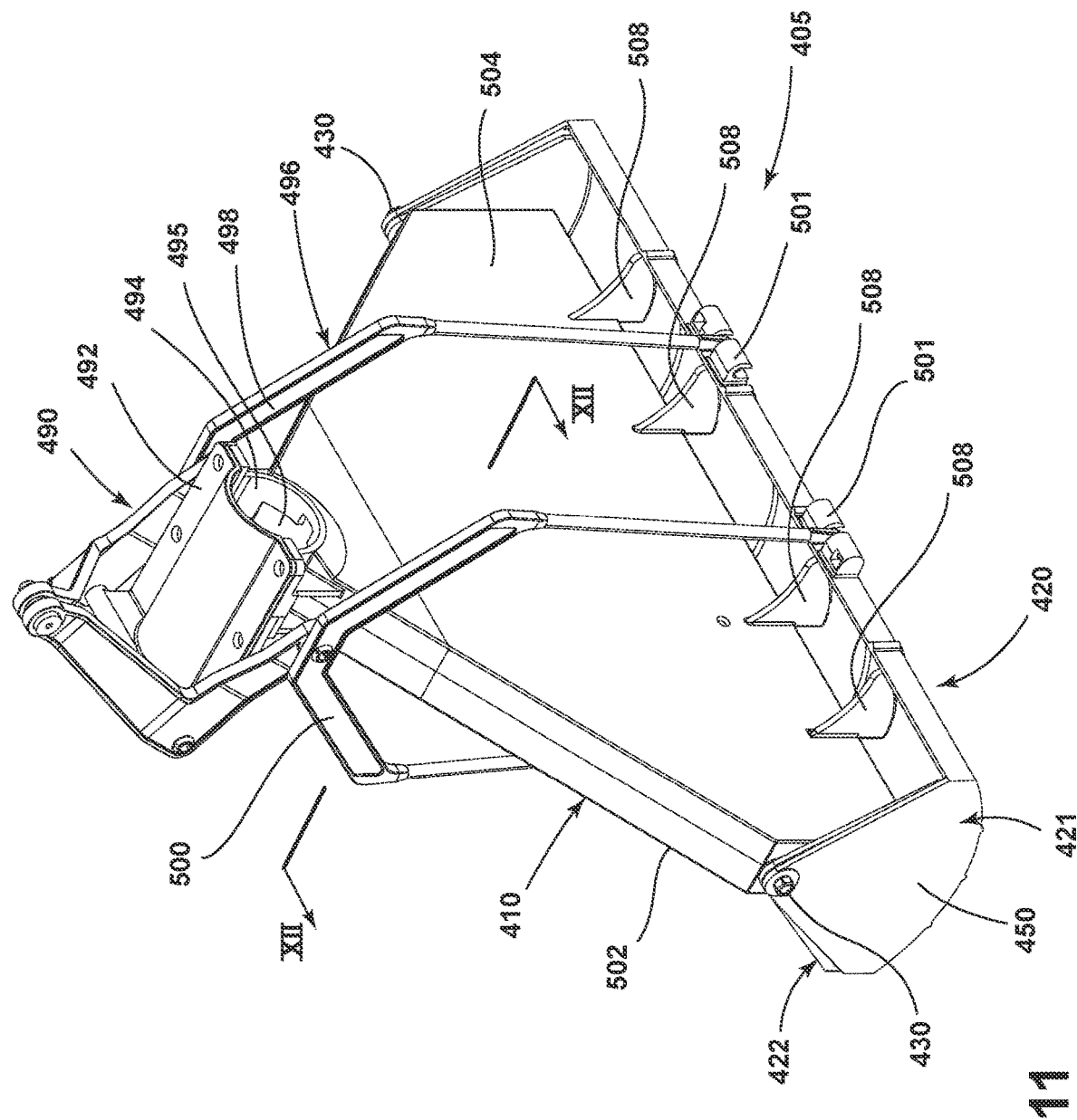
FIG. 11 is a perspective view of an additional embodiment of a feeder, which includes feed saving members.
Figure 13:
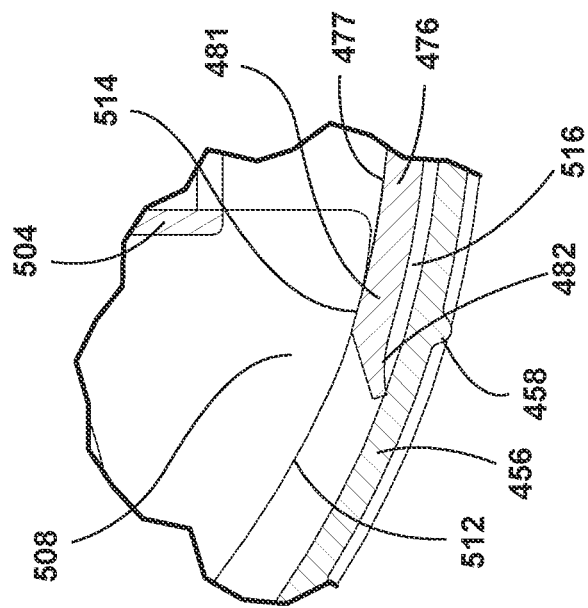
FIG. 13 is an enlarged view of the portion XIII in FIG. 12.
Figure 12:
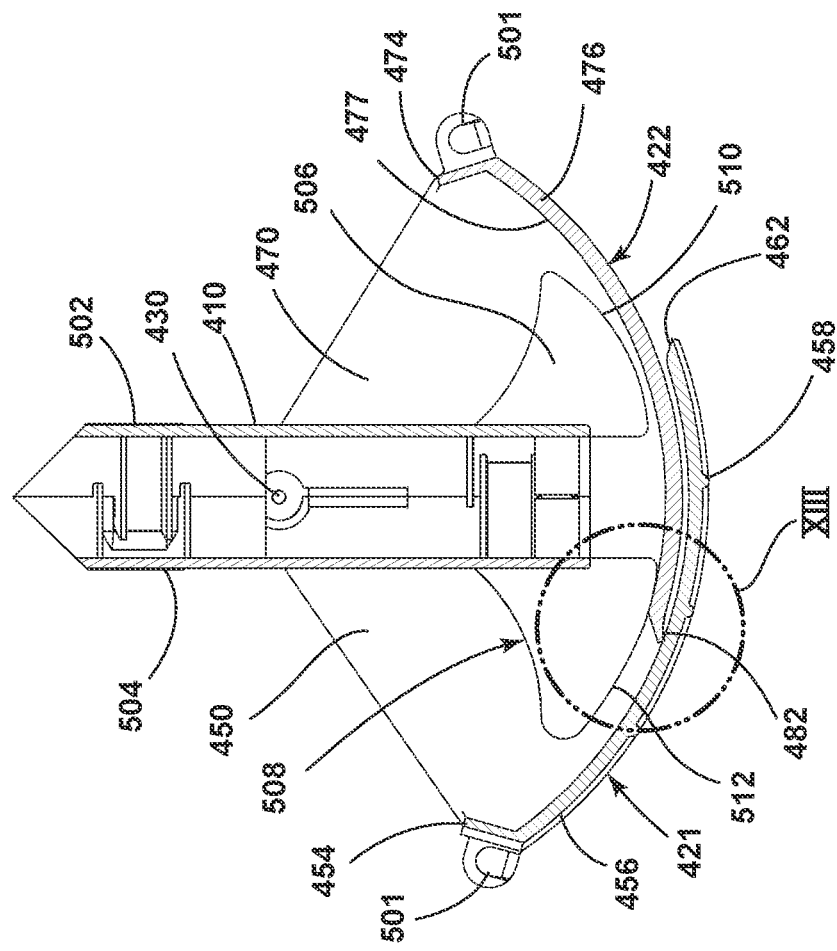
FIG. 12 is a cross-sectional view of the feeder in FIG. 11, taken along the line XII-XII in FIG. 11.

FIGS. 11-13 show another variation of the feeder. Reference number 405 generally designates this additional embodiment of the present invention. Since the feeder 405 is similar to the previously described feeder 5, similar parts appearing in FIGS. 1-7 are represented by the same, corresponding reference number, except with 400 added for the numerals of the latter.

The feed system 405 generally includes a hopper 410 and a receptacle 420, in addition to a feed delivery and attachment system 490. The feed delivery and attachment system 490 includes a top bracket 492, and a bottom bracket 494 which has an aperture 495 therein. The brackets 492, 494 are connectable to each other and encompass a portion of a feed tube, such as feed tube 1, for delivery of feed into the hopper 410. The feed system 405 also includes a swivel system 496 that includes two swivel members 498, 500 which are attached to the exterior on the sides of the receptacle 420. The swivel members 498, 500, are attached at connection members 501, and allow movement of the receptacle 420 components.

The receptacle 420 is comprised of two chutes, an outer chute 421 and an inner chute 422. The chutes 421, 422 are rotatable with respect to one another about an axis created by one or more fasteners 430, as described above with respect to the other embodiments.

The hopper 410 sits above the receptacle 420 and is attached thereto by the one or more fasteners 430, which may be pins. The hopper 410 has two opposing sidewalls 502, 504, creating a generally hollow interior and defining a portion of the exterior of the hopper 410. In this embodiment, the sidewall 502 has four feed saving members 506 attached thereto, and the sidewall 504 has four feed saving members 508 attached thereto. It is contemplated that more or less feed saving members may be attached to each sidewall 502, 504. The feed saving members 506, 508 are each relatively thin in nature and are preferably approximately the same thickness as the walls of each of the chutes 421, 422.

As shown in FIG. 12, the chute 421 includes a base 456 and the chute 422 includes a base 476. Both bases 456, 476 are substantially curved and may have the same radius of curvature or slightly different radii of curvature. A portion of the base 476 is positioned above the base 456 through at least a portion of the range of motion of the chute 421 with respect to the chute 422. The base 456 has an inner end edge 462. The base 476 has an inner end portion 481 (see FIG. 13) and a lip 482 extending downwardly therefrom, preferably at an angle of between about 25° and about 35° if the inner end portion 481 extends at 0°. The lip 482 is substantially straight and extends outside of the arc or circle that the base 476 extends along. The base 456 preferably has a plurality of reinforcement ribs 458 on its underside. The base 476 may also have a plurality of reinforcement ribs (not shown) on its upper side 477, as long as they do not interfere with the feed saving members 506, 508.

The feed saving members 506, 508 are each generally triangular in shape. The feed saving members 506 preferably have a gently curved bottom edge 510, and the feed saving members 508 preferably have a gently curved bottom edge 512. The radius of curvature of the bottom edge 510 is preferably the same or substantially similar to the radius of curvature of the base 476, but may be smaller or larger up to 20%. Likewise, the radius of curvature of the bottom edge 512 is preferably the same or substantially similar to the radius of curvature of the base 476, but also may be smaller or larger up to 20%. In this embodiment, at least a portion of the bottom edge 512 of each of the feed saving members 508, and preferably the bottom edge 510 of each of the feed saving members 506 when needed, engages the upper surface 477 of the base 476 of the upper chute 422 when stationary and through at least a portion of the range of motion, as shown in FIG. 13. Preferably the bottom edges 512 are in constant contact with the upper surface 477 through the entire range of motion of the chute 422 with respect to the chute 421 while the base 476 is adjacent the feed saving members 508. Such contact, shown in FIG. 13 as part number 514, prevents the base 476 of the upper chute 422 from moving upwards. The contact 514 maintains the contact between the lip 482 and the base 456 of the lower chute 421 through the range of motion, thereby preventing feed escaping from an area between the base members 456 and 476 through area 516.

It is preferable that the shape, radii, and relative positions of the bases 456, 476 and the feed saving members 506, 508 be such that either the feed members 508 are in contact with the upper surface 477 of the base 476 at all times through the range of motion while maintaining low friction such that the chutes 421, 422 can be easily moved with respect to one another. However, the feed saving members 506, 508 may only be in contact with the base 476 at certain points to effectively prevent large amounts of feed from escaping.

It is also contemplated that the bottom edges 512 of the feed saving members 508 may be at different vertical positions than the bottom edges 510 of the feed saving members 506 with respect to the upper surface 477. In this scenario the bottom edges 512 are preferably lower than the bottom edges 510, creating a tighter system when the feeder is in a more closed state. Such an arrangement gives the advantages of both being easy to operate and saving feed from escaping from the receptacle 420.

FIGS. 14-18 show another variation of the feeder. Reference number 605 generally designates this additional embodiment of the present invention. Since the feeder 605 is similar to the previously described feeder 405, similar parts appearing in FIGS. 11-13 are represented by the same, corresponding reference number, except with 200 added for the numerals of the latter.

The feed system 605 generally includes a hopper 610 and a receptacle 620, in addition to a feed delivery and attachment system (not shown), which may be the same or similar to that disclosed elsewhere herein. The receptacle 620 is comprised of two chutes, an outer chute 621 and an inner chute 622. The chutes 621, 622 are rotatable with respect to one another about an axis created by one or more fasteners 630, as described above with respect to the other embodiments.

Figure 15:
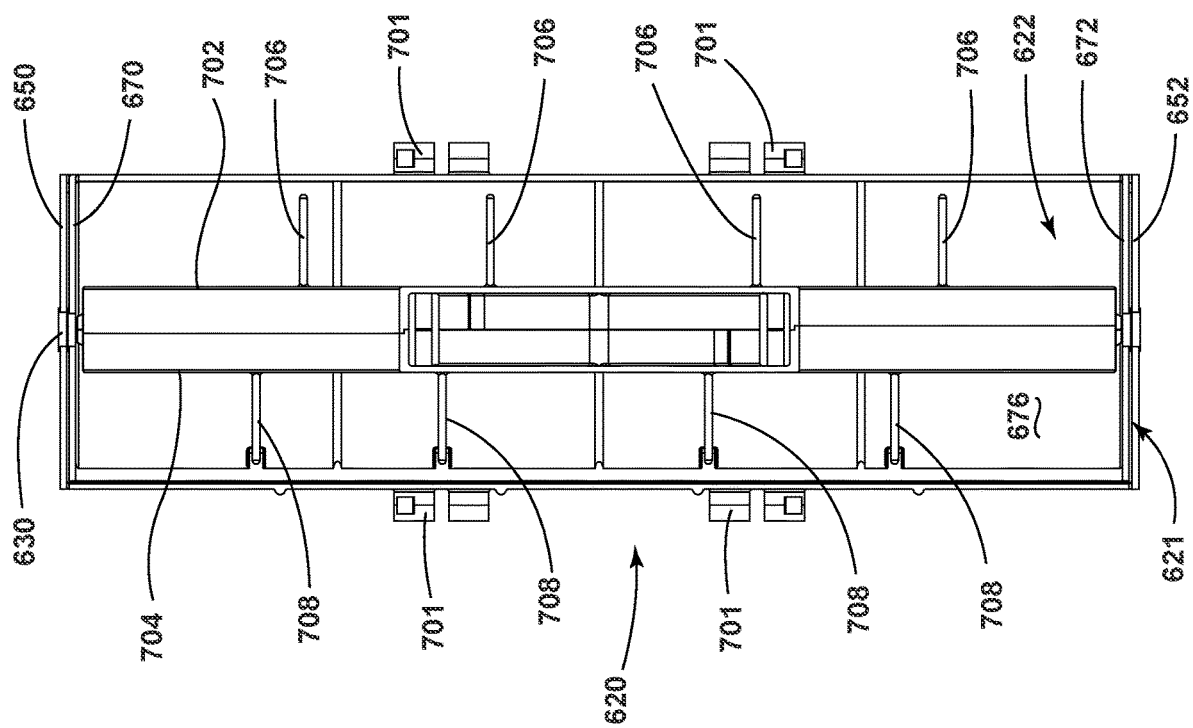
FIG. 15 is a top plan view of the feeder in FIG. 14.

The hopper 610 sits above the receptacle 620 and is attached thereto by the one or more of the fasteners 630, which may be pins. The hopper 610 has two opposing side walls 702, 704, creating a generally hollow interior and defining a portion of the exterior of the hopper 610. In this embodiment, the sidewall 702 has one or more feed saving members 706 attached thereto, and the sidewall 704 has one or more—four as shown in FIGS. 14 and 15—feed saving members 708 attached thereto. The feed saving members 706, 708 are each relatively thin in nature and are preferably approximately the same thickness as the walls of each of the chutes 621, 622. The feed saving members 706 and the feed saving members 708 are offset with respect to each other in the longitudinal direction, as shown in FIG. 15. In other words, a particular feed saving member 706 is not at the exact longitudinal distance from the end wall 670 as a corresponding feed saving member 708. The offset nature of the feed saving members 706, 708 reduces overall friction as the chutes 621, 622 move with respect to one another.

Figure 16:
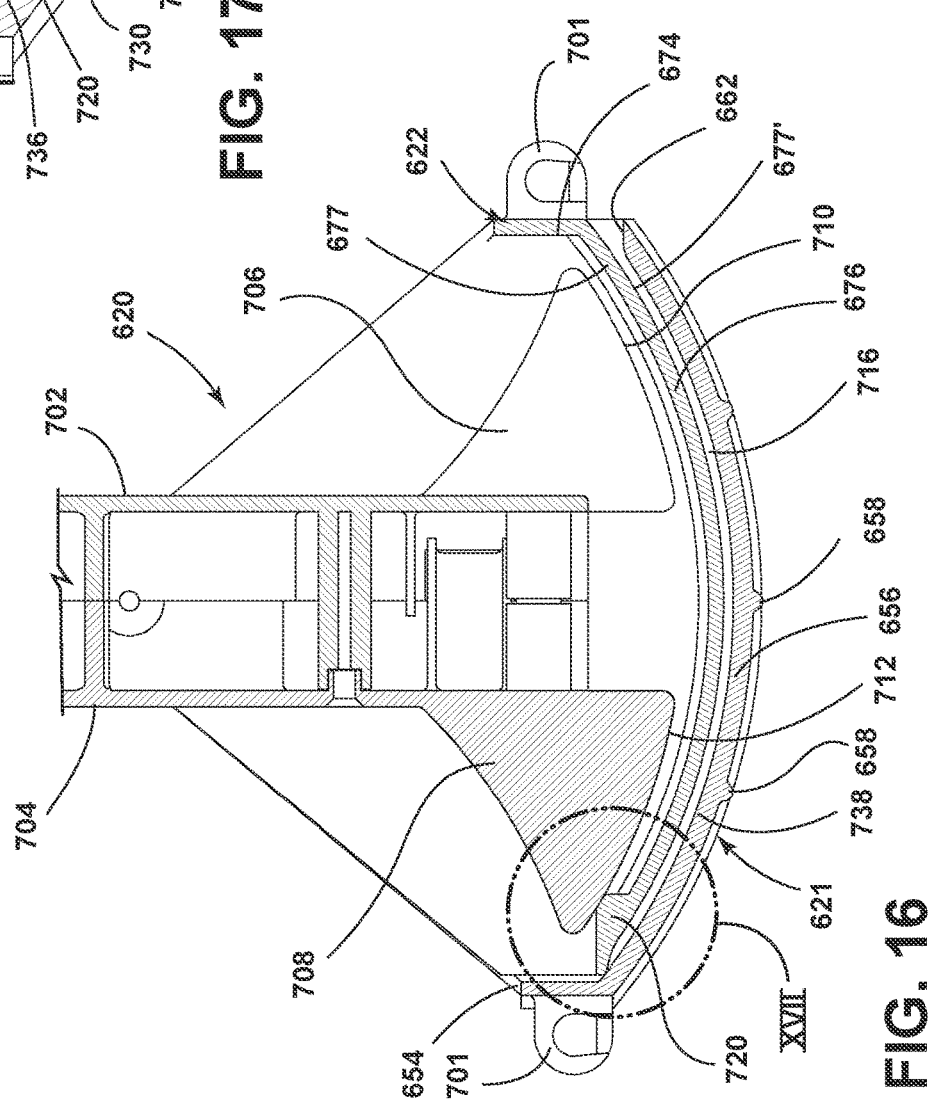
FIG. 16 is a first cross-sectional view of the feeder in FIG. 14, taken along the line XVI-XVI in FIG. 14.
Figure 18:
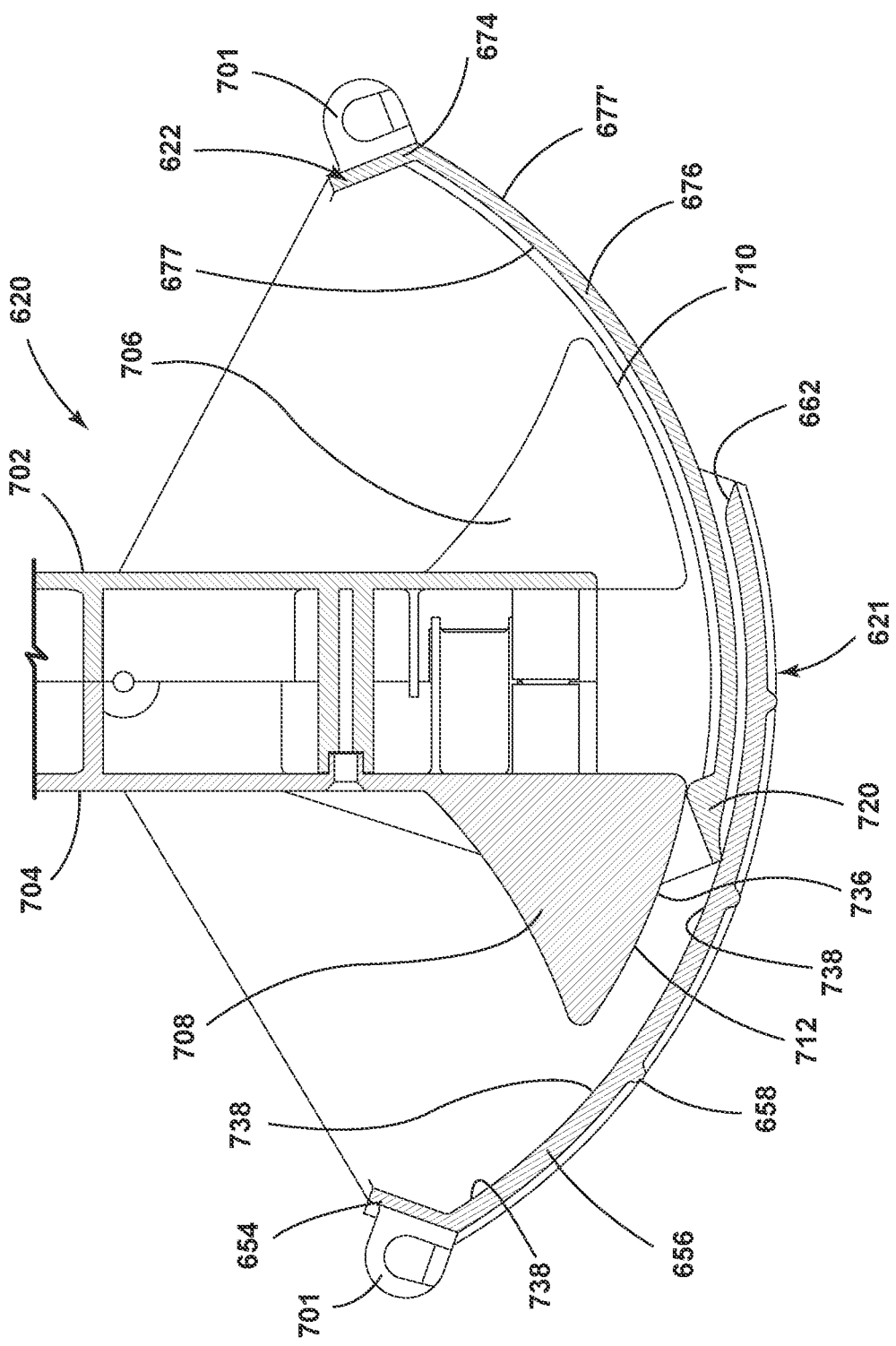
FIG. 18 is a second cross-sectional view of the feeder in FIG. 14.

As shown in FIGS. 16 and 18, the chute 621 includes a base 656 and the chute 622 includes a base 676. Both bases 656, 676 are curved in nature and may have the same radius of curvature or slightly different radii of curvature. A portion of the base 676 is positioned above the base 656 through at least a portion of a range of motion of the chute 621 with respect to the chute 622. The base 656 has an end edge 662 and an upper surface 738, and the base 676 has an upper surface 677, a bottom surface 677', and one or more nubs 720, which are described in more detail below. The base 656 preferably has a plurality of reinforcement ribs 658 on its underside. The base 676 may also have a plurality of reinforcement ribs on its upper surface 677, as long as they are positioned so as not to interfere with the feed saving members 706, 708.

The feed saving members 706, 708 are each generally triangular in shape. The feed saving members 706 preferably have a slightly curved bottom edge 710, and the feed saving members 708 preferably have a slightly curved bottom edge 712. The curvature of the bottom edges 710, 712 preferably have the same or substantially similar curvature as that of the base 656, but may be different from that of the base 656 and relative to each other, up to 20%.

Figure 17:
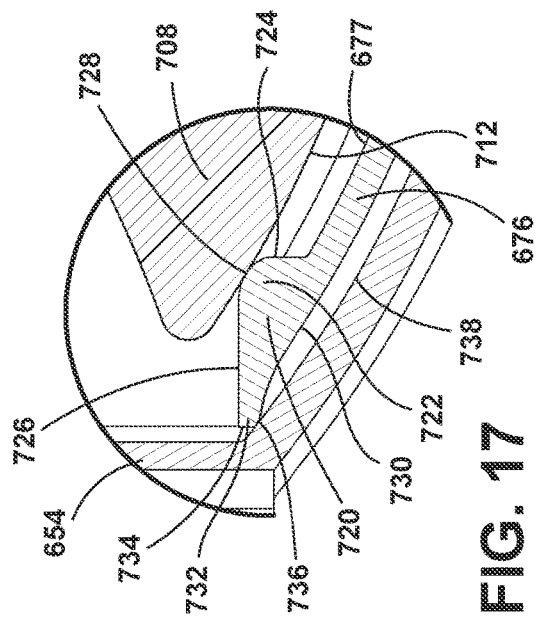
FIG. 17 is an enlarged view of the portion XVII in FIG. 16.

The nubs 720 are positioned at or adjacent the inner end of the base 676, and disposed in the longitudinal direction of the feeder at the same positions as the feed saving members 708. This positioning ensures that the nubs 720 will come in contact with the feed saving members 708 during use. Each nub 720, as shown in FIG. 17, includes a bulbous portion 722 that extends upwardly with respect to the general curvature of the upper surface 677 of the base 676 such that a portion of the nub 720 is elevated with respect to the upper surface 677. The bulbous portion 722 is a hump along the otherwise smooth curvature of the base 676, and includes a first angled side 724 which intersects with the upper surface 677 of the base 676, a second angled side 726 which extends to an end edge 734 of the nub 720 and preferably of the chute 622, and a peak portion 728 which is the intersection of the sides 724, 726, and the highest portion of the bulbous portion 722. Where the bulbous portion 722 is positioned circumferentially along the base 676, a bottom surface 730 of the nub 720 is disposed, and extends along a curve as shown in FIGS. 16-18, having the general shape and curvature of the bottom surface 677' of the base 676. The peak portion 728 is in contact with the bottom edge 712, through a portion of the range of motion of the chute 622 as shown in FIGS. 16-18.

The nub 720 further includes a distal member 732 extending from the bulbous portion 722. The distal member 732 extends downwardly from the bulbous portion 722 and terminates at the edge 734 which has a lower tip 736. The contact between the peak portion 728 and the bottom edge 712 maintains contact between the distal member 732, specifically the lower tip 736, and an upper surface 738 of the base 656 through a range of motion. The contact between the peak 728 and the feed saving member 708 occurs during the range of motion of the inner chute 622 with respect to the outer chute 621. The contact of all of the nubs 720 with the feed saving members 708 prevents feed from escaping out of the receptacle 620 between the base 676 and the base 656.

FIG. 18 shows the feeder of this embodiment in a more open state, that is, rotated such that the walls 654, 674 are further apart from each other than in FIG. 16. At this rotational position, the nubs 720 remain in contact with the feed saving members 708 and thus the tip 736 of each nub 720 is in contact with the upper surface 738 of the base 656. Further rotation results in less friction between the nub 720 and the upper surface 738 of the base 656.

The embodiments which include a lip and feed saving members can be designed and fine-tuned to allow the lip to be a predetermined distance from the upper surface of the base of the bottom tray, such as 0.0 mm or 0.5 mm, through a portion or all of the range of motion, to have the preferred setup to prevent feed from escaping and to reduce friction between parts of the feeder. Thus, it will be seen that the embodiments of the present invention provide a receptacle for retaining feed that is expandable in volume to control the amount of feed retained therein. This invention allows both the surface area of feed and the depth of the feeder to be regulated as desired according to the age and nature of the poultry being fed. Moreover, the receptacle retains even the finest of feed. It will be understood that the present invention can be similarly used in the feeding of other animals besides poultry.

Various alternative embodiments are contemplated by the present invention, including the provision of a third wall member mounted between the chutes 21 and 22 for expanded capacity. In that variant, the third wall could be relatively fixed, with two sets of pins 30 mounted on each end thereof to permit the chutes 21 and 22 to move relative to the third wall. In that case the axis of movement of the chute 21 about its pins 30 would preferably be parallel to the axis of movement of the chute 22 about its pins 30. In this embodiment, the chute 22 may have two lips to prevent feed from escaping, depending on the structure of the third wall. If such separate pins 30 are used, the axis between each set of pins for each chute is preferably parallel. Another embodiment could include only a single movable chute, pivotable relative to a single, fixed wall.

Further, alternative control systems can be employed to move the chutes 21 and 22 simultaneously or individually, as desired in particular applications. Although it is often desirable to have each receptacle 20 in the feeder systems configured to retain the same volume of feed, in particular situations, receptacles 20 can be individually controlled to have differing volumes of feed.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A poultry feeder comprising:
   a first tray member having a first base;
   a second tray member having a second base, the second tray member including an inner end portion and a lip disposed at the inner end portion and extending to an end edge;
   the first tray member and the second tray member adjacent one another and movable with respect to one another thereby together defining a size-adjustable tray; and
   a top member disposed above the second tray member, wherein the end edge of the lip of the second tray member engages the first base of the first tray member, and a portion of the second base engages the top member through a range of motion to prevent the lip from moving away from the first tray member a predetermined distance.

2. The poultry feeder of claim 1, wherein the first base of the first tray member has a first tray curvature.

3. The poultry feeder of claim 2, wherein the second base of the second tray member has a second tray curvature.

4. The poultry feeder of claim 3, wherein the first tray member and the second tray member are rotatably movable with respect to each other about a pivot axis.

5. The poultry feeder of claim 1, wherein the lip is downwardly extending with respect to the second base.

6. The poultry feeder of claim 1, wherein the second base includes a nub, of which the lip is a part, that engages the top member.

7. The poultry feeder of claim 6, wherein the top member causes the lip to be in constant contact with the first tray member through the range of motion.

8. The poultry feeder of claim 1, wherein the top member causes the lip to be in constant contact with the first tray member through the range of motion.

9. A poultry feeder comprising:
   a hopper connectable to a feed line, the hopper having a first side wall, a second side wall, and a feed saving member connected to the first side wall; and
   a receptacle disposed below the hopper, the receptacle comprising:

a first chute having a first end wall, a second end wall, and a first base attached to the first end wall and the second end wall, the first base having a first upper base surface;

a second chute disposed adjacent the first chute, the second chute having a third end wall, a fourth end wall, and a second base attached to the third end wall and the fourth end wall and having an inner end and a second base upper surface, the inner end having an edge tip contacting the upper surface of the first base, the second chute being moveable with respect to the first chute along a range of motion, at least one feed saving member engaging the second base upper surface through at least a portion of the range of motion of the second chute.

10. The poultry feeder of claim 9, wherein the first base of the first tray member has a first tray curvature.

11. The poultry feeder of claim 10, wherein the second base of the second tray member has a second tray curvature.

12. The poultry feeder of claim 11, wherein the first tray curvature and the second tray curvature are substantially the same.

13. The poultry feeder of claim 9, wherein the second base includes a nub which has a peak that is in contact with the at least one feed saving member.

14. The poultry feeder of claim 9, wherein the at least one feed saving member is a plurality of feed saving members.

* * * * *